(12) United States Patent
Schaefer

(10) Patent No.: US 11,719,189 B2
(45) Date of Patent: Aug. 8, 2023

(54) FLEXIBLE SLEEVE FOR ADJUSTABLE FAN DUCT NOZZLE

(71) Applicant: SPIRIT AEROSYSTEMS, INC., Wichita, KS (US)

(72) Inventor: Henry Arnold Schaefer, Wichita, KS (US)

(73) Assignee: SPIRIT AEROSYSTEMS, INC., Wichita, KS (US)

( * ) Notice: Subject to any disclaimer, the term of this patent is extended or adjusted under 35 U.S.C. 154(b) by 87 days.

(21) Appl. No.: 17/167,241

(22) Filed: Feb. 4, 2021

(65) Prior Publication Data

US 2021/0404416 A1    Dec. 30, 2021

Related U.S. Application Data

(62) Division of application No. 15/927,669, filed on Mar. 21, 2018, now abandoned.

(51) Int. Cl.
*F02K 1/72* (2006.01)
*F02K 1/34* (2006.01)
*F02K 1/09* (2006.01)

(52) U.S. Cl.
CPC .................. *F02K 1/72* (2013.01); *F02K 1/09* (2013.01); *F02K 1/34* (2013.01)

(58) Field of Classification Search
CPC ..... F02K 1/70; F02K 1/72; F02K 1/09; F02K 1/34; F02K 1/1207
See application file for complete search history.

(56) References Cited

U.S. PATENT DOCUMENTS

| 7,716,932 B2 * | 5/2010 | Core | F02K 1/1207 60/771 |
|---|---|---|---|
| 2009/0260345 A1 * | 10/2009 | Chaudhry | F02K 1/10 60/226.3 |
| 2010/0139240 A1 * | 6/2010 | Levasseur | F02K 1/085 60/226.3 |
| 2012/0109593 A1 * | 5/2012 | Hall | B64D 33/04 60/226.3 |
| 2013/0306755 A1 * | 11/2013 | Dittmann | F02K 1/1223 239/265.25 |
| 2015/0369078 A1 * | 12/2015 | Sawyers-Abbott | F02K 1/72 415/1 |

\* cited by examiner

*Primary Examiner* — Ehud Gartenberg
*Assistant Examiner* — Henry Ng
(74) *Attorney, Agent, or Firm* — Hovey Williams LLP

(57) ABSTRACT

A ducted fan housing for directing a duct flow includes an annular cowling and an adjustable fan duct nozzle. The nozzle includes a flexible sleeve having rigid areas arranged circumferentially around the nozzle orifice and connected by flexible areas so as to form a unitary sleeve structure. The rigid areas are radially moveable between a normal configuration in which the orifice is smaller and a dilated configuration in which the orifice is larger. A drive mechanism uses drive elements to move at least some of the rigid areas between the configurations to adjust the size of the orifice. The rigid areas may be constructed from laminated graphite and epoxy, and the flexible areas may be constructed from laminated graphite and soft resin. If the housing includes a thrust reverser, then a flexible joint area extends circumferentially around the housing and connects the flexible sleeve to a thrust reverser cowl.

20 Claims, 16 Drawing Sheets

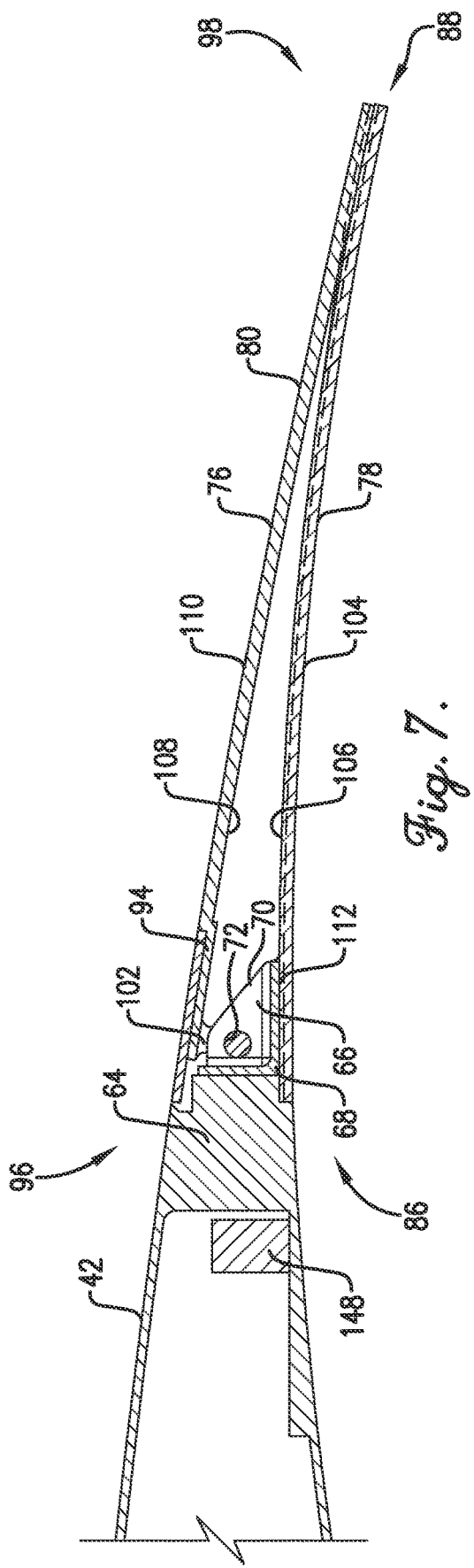

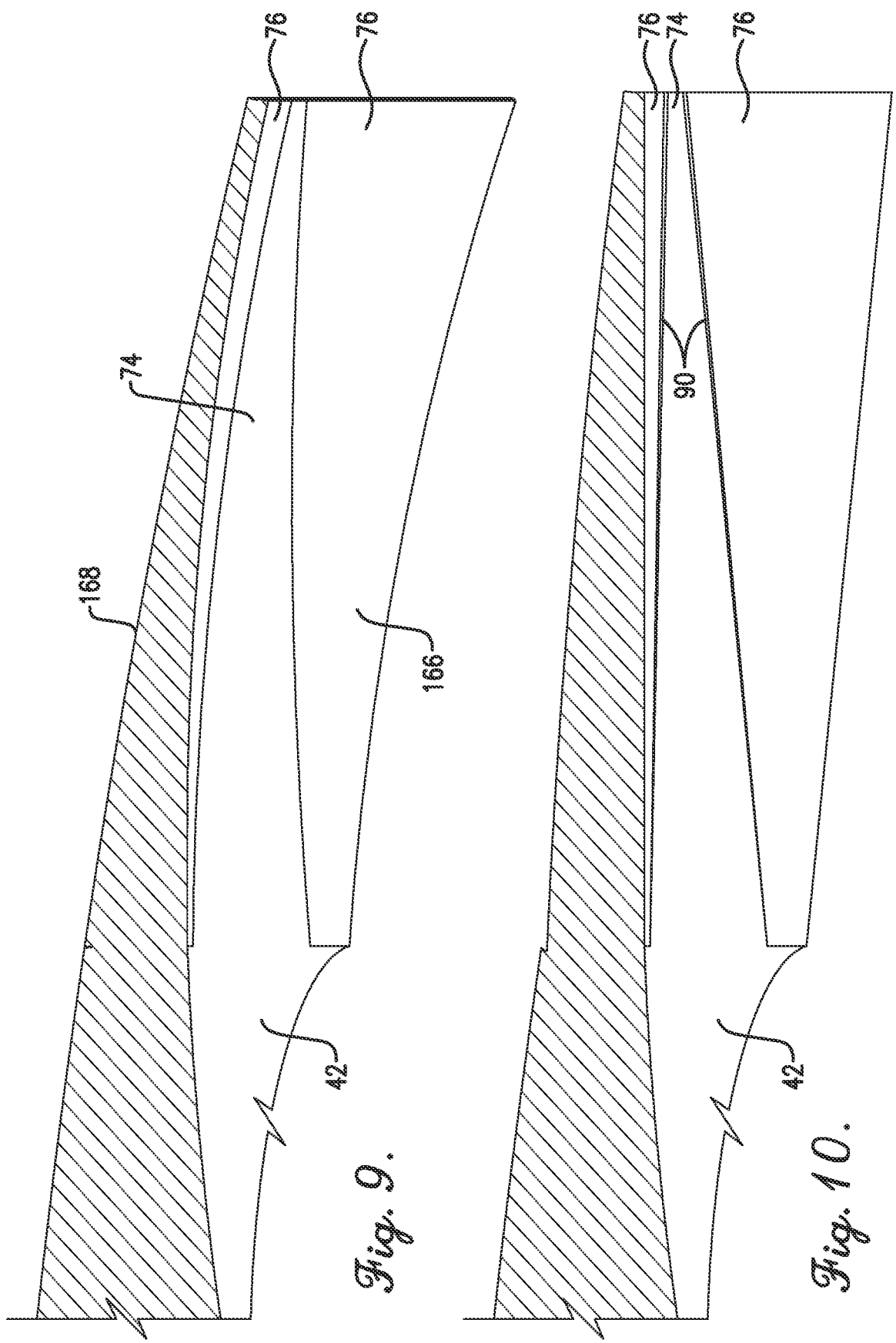

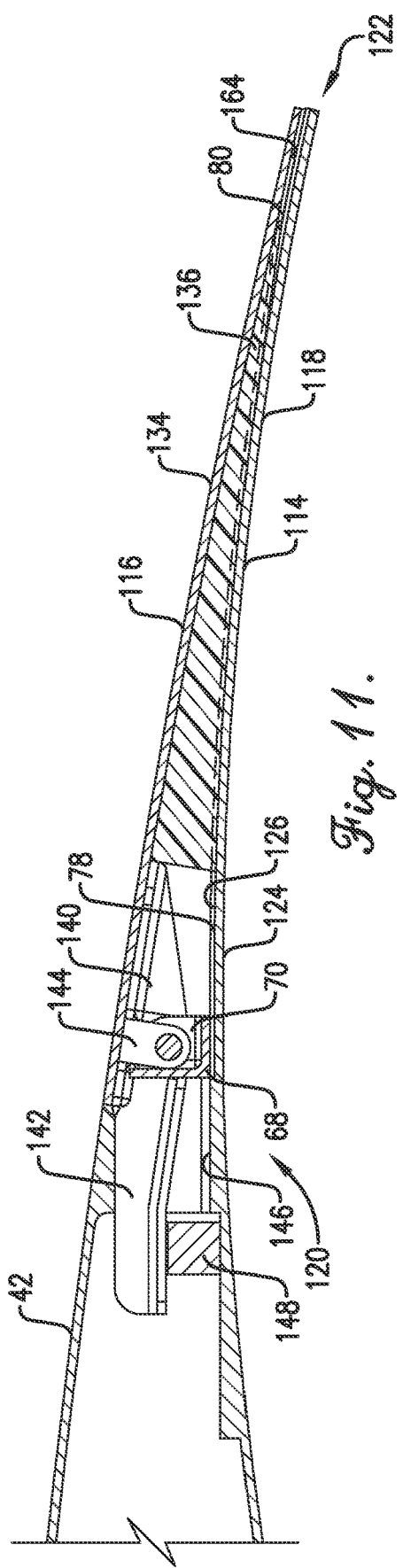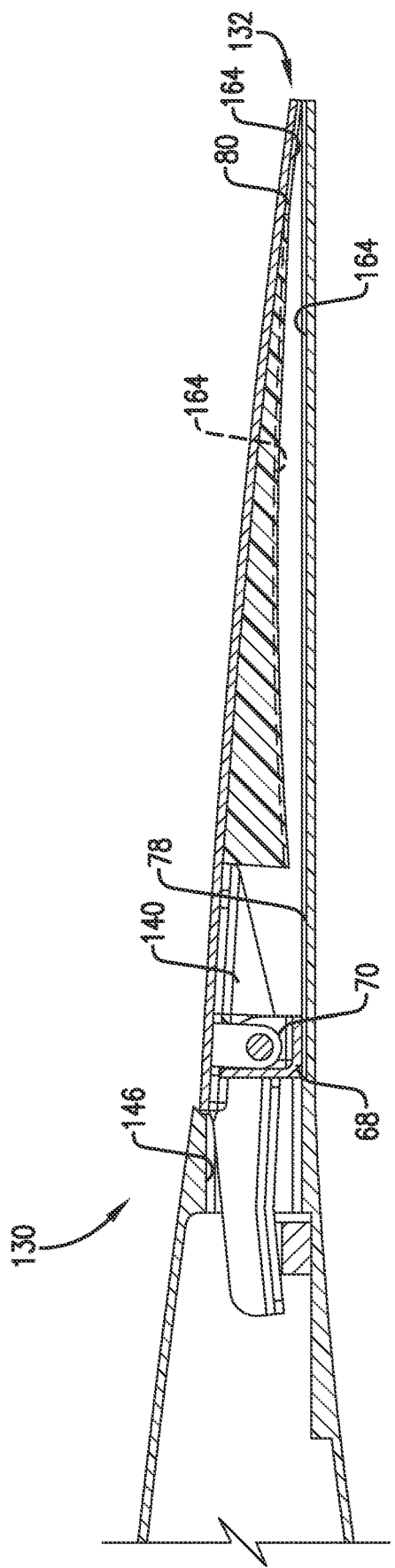

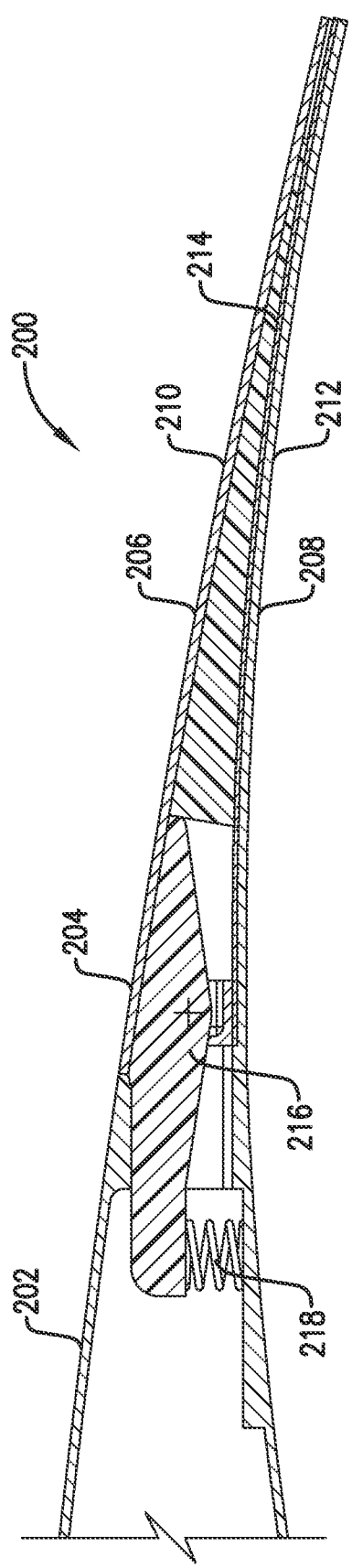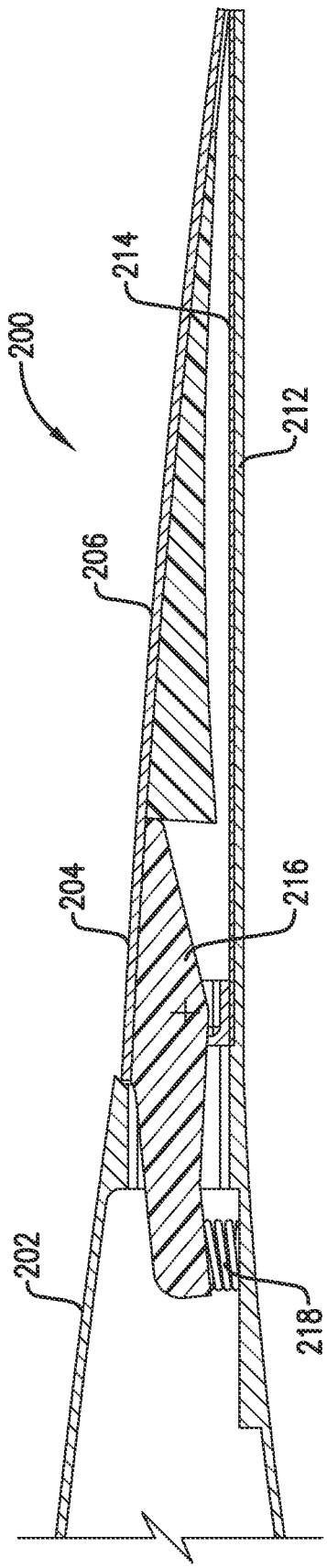

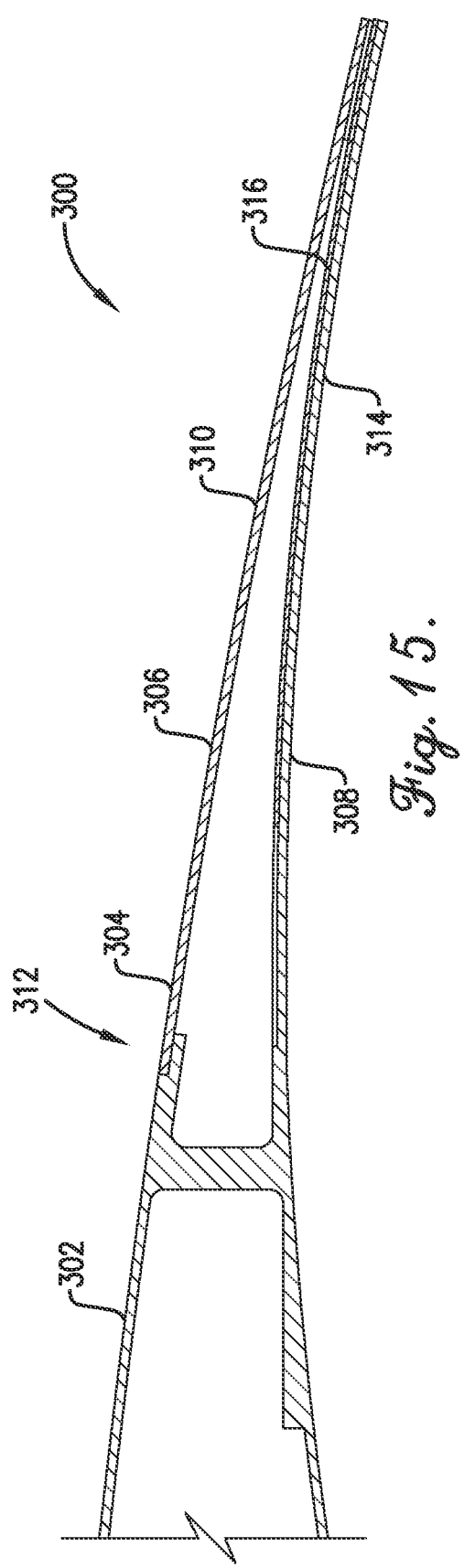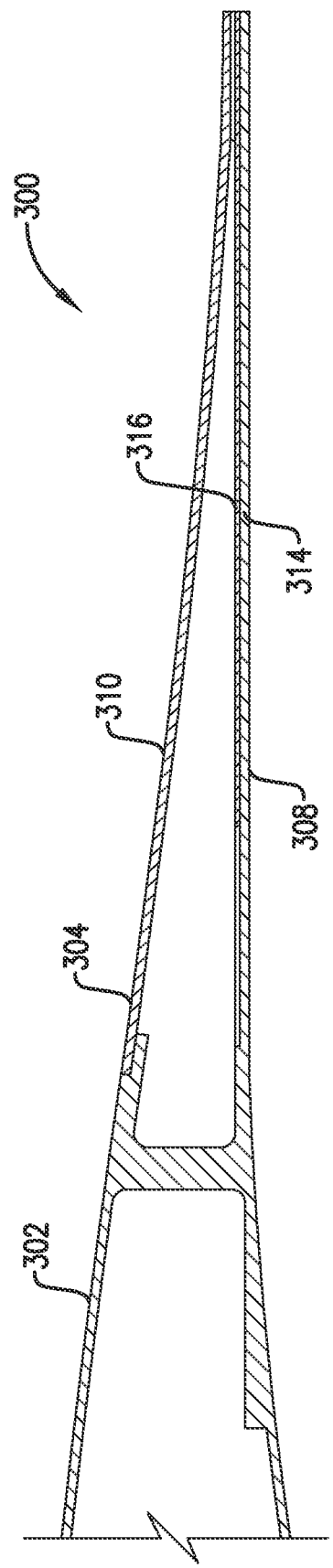

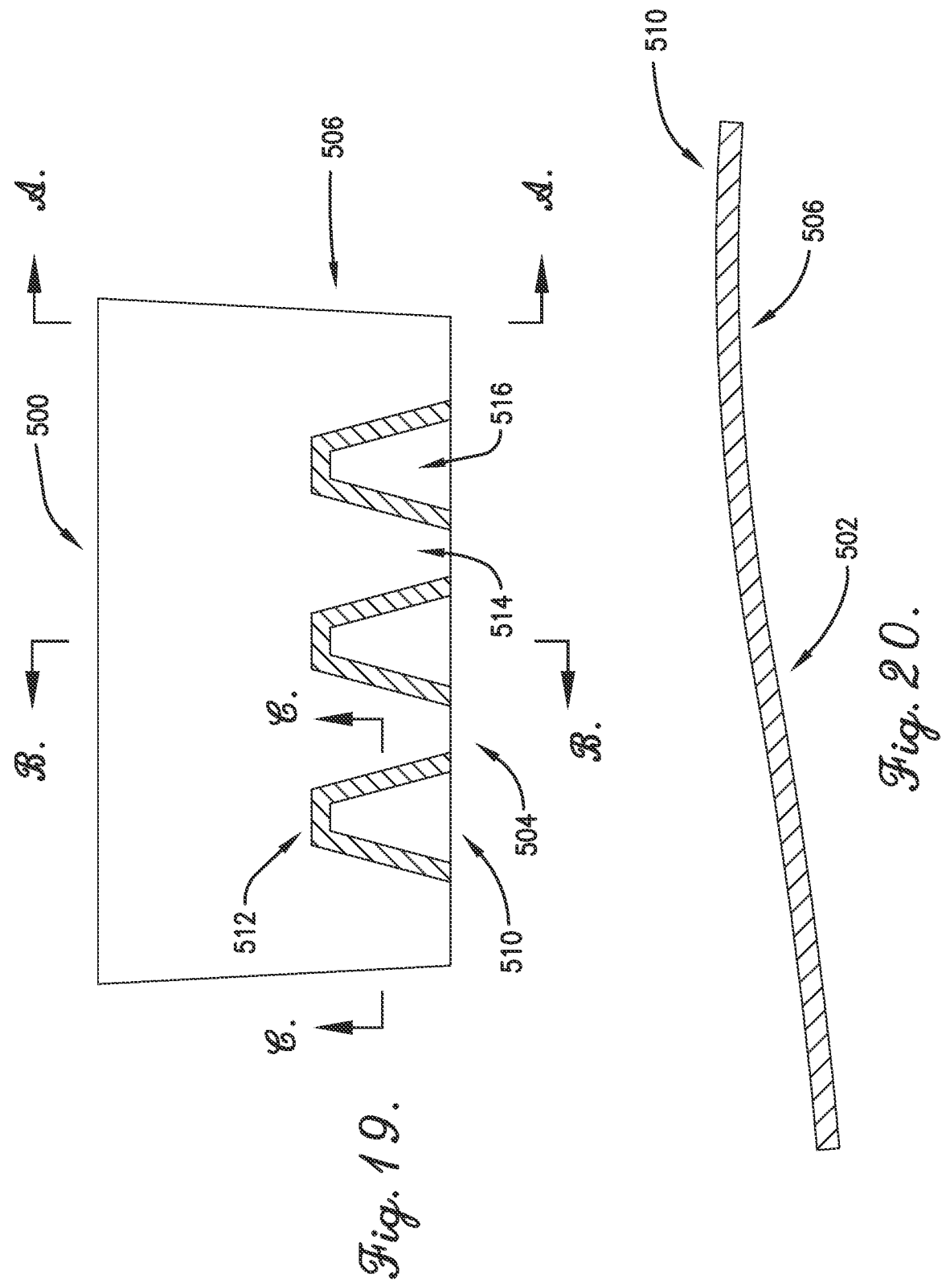

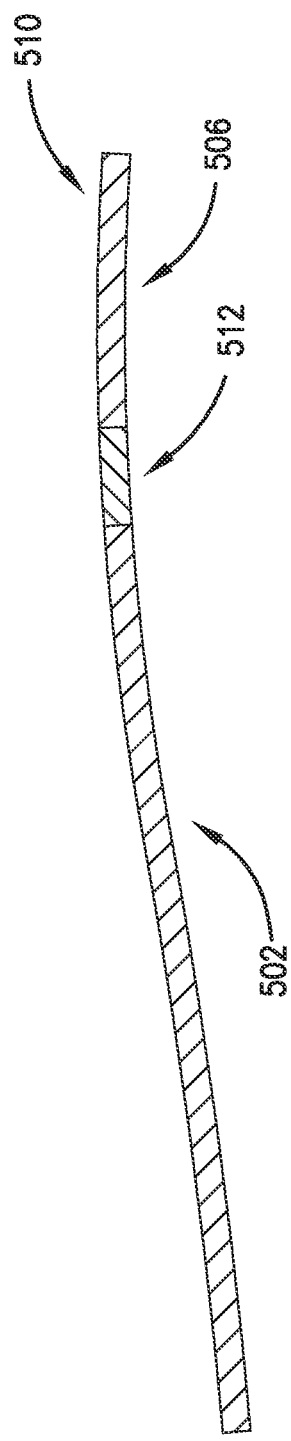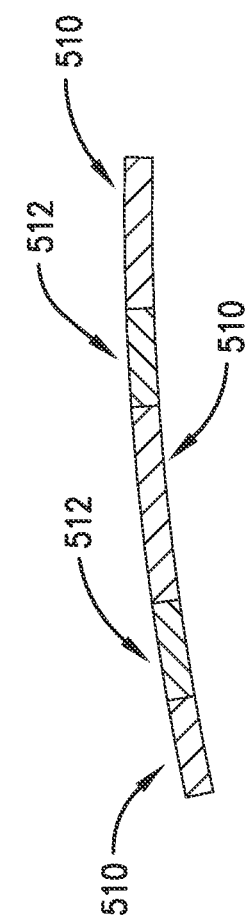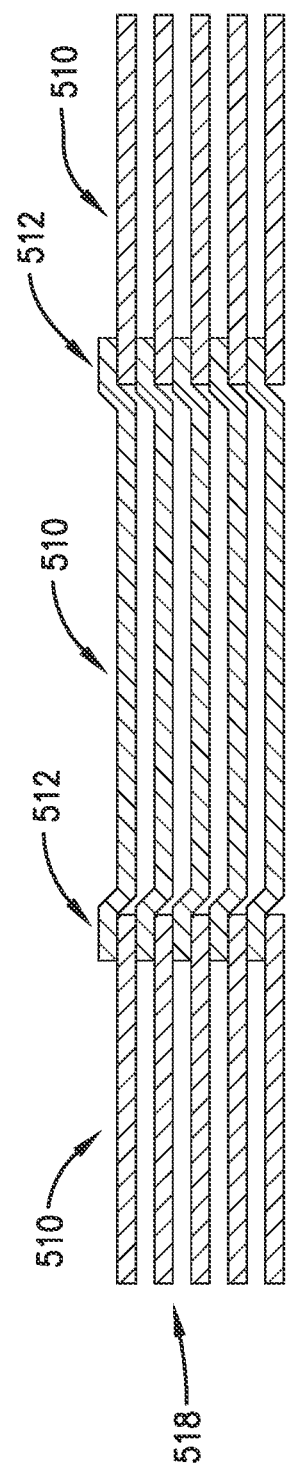

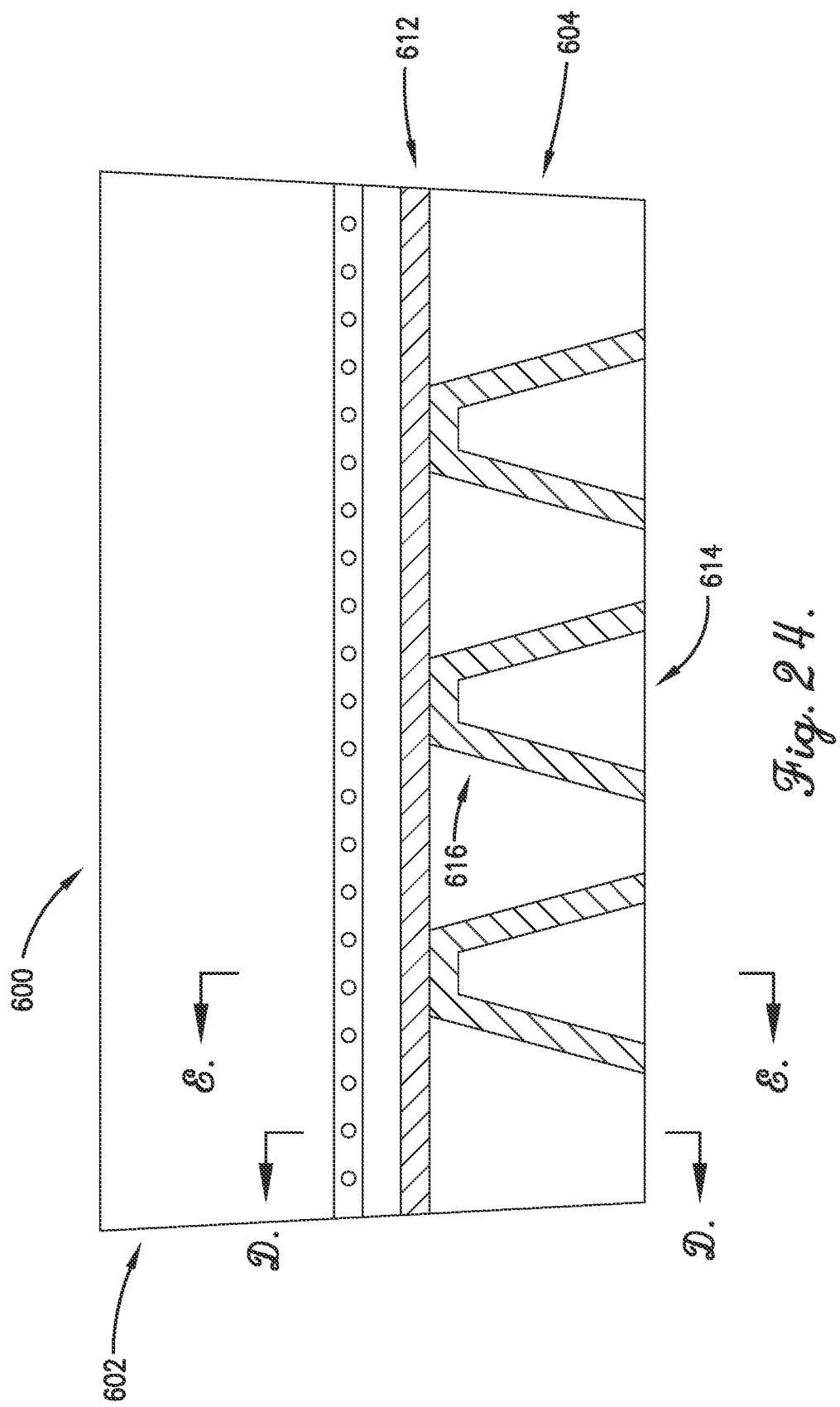

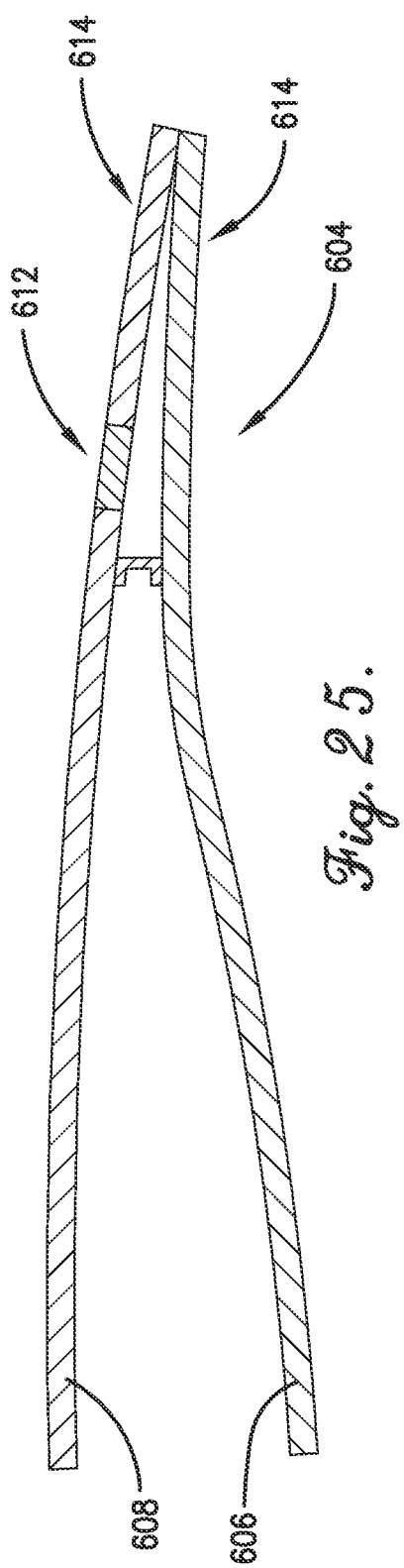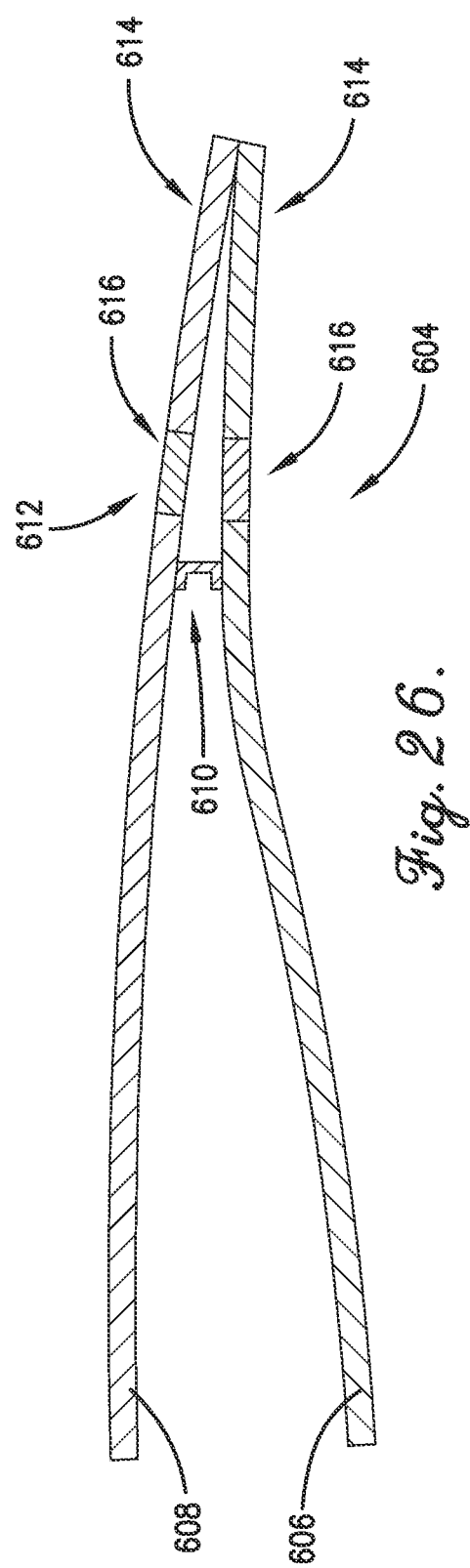

FLEXIBLE SLEEVE FOR ADJUSTABLE FAN DUCT NOZZLE

RELATED APPLICATIONS

The present U.S. patent application is a divisional and claims priority benefit of a prior-filed U.S. non-provisional patent application with the same title, Ser. No. 15/927,669, filed Mar. 21, 2018. The entire content of the identified prior-filed application is incorporated by reference as if fully set forth herein.

FIELD

The present invention relates to fan duct nozzles for engaging duct flow generated by a fan in an aircraft engine, and more particularly, embodiments concern a flexible sleeve for an adjustable fan duct nozzle, wherein the flexible sleeve is moveable between a normal configuration in which a nozzle orifice is smaller and a dilated configuration in which the nozzle orifice is larger.

BACKGROUND

Conventional aircraft engines include a housing that directs air around the housing, directs air into the engine, and directs exhaust gas out of the engine. The housing normally includes an exhaust nozzle that defines an exit area of the engine and thereby affects the exhaust flow velocity out of the engine. Variable area exhaust nozzles are used to adjust the exhaust flow velocity and thereby change the engine thrust. Turbofan engines include a bypass fan that develops thrust. Prior art exhaust nozzles suffer from a number of limitations, including failing to adequately reduce the noise generated by gas turbine engines. Also, prior art turbofan engines discharge air through bypass ducts and thereby generate significant noise, and the bypass ducts fail to adequately reduce turbofan noise and optimize propulsion performance.

Prior art turbofan engines with fixed fan nozzles must be designed to operate at all flight envelopes, most notably taking-off, cruising, and landing. However, the optimum fan exit area is different for different flight conditions. As a result, compromises are made in determining the engine final fan nozzle area in order to meet the requirements at all flight envelopes. A variable area fan nozzle (VAFN) could be tailored for each flight condition. Although the amount of area range is dependent on engine configuration, a variation of 20% may cover the typical design space. For a medium-sized fan, the amount of movement in the aft portion of the fan duct may be approximately 2 inches to create an area variation of 20%. Various concepts have been proposed to achieve a VAFN, and a few have been flight tested. However, none has been transferred into a commercial aircraft production program because added weight, increased complexity, and aerodynamic deficiencies of the proposed concepts outweighed the performance gains.

One prior art solution involves a type of translating sleeve concept that would increase the area of the nozzle orifice. This translating concept splits the thrust reverser sleeve at a distance forward of the fan nozzle exit. The split sleeve can translate separately from the thrust reverser sleeve, thereby increasing the exit area. The concept is seemingly straight-forward and can be readily integrated into the structure of existing translating sleeve thrust reversers with a straight-forward actuation system. However, achieving a 20% increase in area would require excessive translations. Additionally, some leakage in the fan duct is expected during translation, which would reduce the overall performance. Another prior art solution builds on the translating sleeve concept, but introduces a gap forward of the nozzle exit area that also increases flow area and thereby reduces the translation distance required to achieve the necessary increase in nozzle area. However, the resulting structure around the split sleeve is aerodynamically "dirty," creating added drag which negatively impacts overall operational efficiency. Thus, although both of these prior art solutions provide variable exit area for the fan duct, they both are heavy, have sealing deficiencies, and create additional aerodynamic drag in both the external and internal fan duct flow surface.

This background discussion is intended to provide information related to the present invention which is not necessarily prior art.

SUMMARY

Embodiments address the above-discussed and other problems and limitations of the prior art by providing a flexible sleeve for an adjustable fan duct nozzle, wherein the flexible sleeve is moveable between a normal configuration in which a nozzle orifice is smaller and a dilated configuration in which the nozzle orifice is larger. The flexible sleeve provides for adjusting the size of the nozzle orifice while reducing or eliminating pivoting or sliding interfaces, and thereby improves aerodynamic cleanliness and sealing qualities and reduces complexity and weight over prior art solutions.

In one embodiment, a ducted fan housing is provided for directing a duct flow generated by a fan in a rearward direction. The ducted fan housing may broadly comprise an annular cowling and an adjustable fan duct nozzle including a flexible sleeve and a drive mechanism. The annular cowling may have an aft end and surround the fan and extend rearwardly of the fan to the aft end, and may be configured to fluidly engage the duct flow. The adjustable fan duct nozzle may be located at the aft end of the annular cowling, and may be configured to fluidly engage the duct flow from the annular cowling. The flexible sleeve may include a plurality of rigid areas arranged circumferentially around a nozzle orifice and connected by flexible areas so as to form a unitary sleeve structure. The rigid areas may be radially moveable between a normal configuration in which the nozzle orifice is smaller and a dilated configuration in which the nozzle orifice is larger. The drive mechanism may be configured to move at least some of the plurality of rigid areas between the normal configuration and the dilated configuration so as to adjust the nozzle orifice and thereby control the duct flow passing through the adjustable fan duct nozzle.

Various implementations of the foregoing embodiment may include any one or more of the following features. The flexible areas may flex so as to remain continuously connected to the rigid areas in both the normal configuration and the dilated configuration. The rigid areas may be constructed at least in part from laminated graphite and epoxy, and/or the flexible areas may be constructed at least in part from laminated graphite and soft resin. The rigid areas may include drive areas arranged alternatingly with driven areas, and the drive mechanism may be configured to move the drive areas, and the drive areas may be configured to move the driven areas, between the normal configuration and the dilated configuration so as to adjust the nozzle orifice and thereby control the duct flow passing through the adjustable fan duct nozzle.

The drive mechanism may include one or more drive elements attached to at least some of the rigid areas and configured to transfer a drive force to move the rigid areas between the normal configuration and the dilated configuration. Each drive element may include an axially extending lever pivotally attached to a bracket, and may further include a cam configured to transfer the drive force to the axially extending lever. Each drive element may be constructed at least in part from a shape memory alloy material.

At least some of the rigid areas may be naturally biased toward the dilated configuration, such that these rigid areas are naturally urged toward the dilated configuration when placed in the normal configuration. At least some of the rigid areas may be naturally biased toward the normal configuration, such that these rigid areas are naturally urged toward the normal configuration when placed in the dilated configuration.

The ducted fan housing may further include a thrust reverser, the annular cowling may further include a rigid inner acoustic panel and a rigid outer thrust reverser cowl, and the flexible sleeve may further includes a flexible joint area extending circumferentially around the ducted fan housing and connecting the flexible sleeve to the thrust reverser cowl so as to allow independent deployment of the thrust reverser and adjustment of the nozzle orifice, wherein each of the inner acoustic panel and the thrust reverser cowl includes the rigid areas and the flexible areas which allow for adjusting the nozzle orifice.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is a fragmentary cross-sectional view, taken in a circumferential direction, of the ducted fan housing shown in FIGS. 1-5, showing the driven tiles in a radially innermost nominal tile position;

FIG. 8 is a fragmentary cross-sectional view, taken in a circumferential direction, of the ducted fan housing shown in FIGS. 1-5 and 7, showing the driven tiles in a radially outermost dilated tile position;

FIG. 9 is a fragmentary schematic cross-sectional view of the ducted fan housing shown in FIGS. 1-5, 7, and 8, showing the drive and driven tiles in the nominal tile position;

FIG. 10 is a fragmentary schematic cross-sectional view of the ducted fan housing shown in FIGS. 1-5 and 7-9, showing the drive tiles in the dilated tile position, with the adjacent tiles being shifted circumferentially away from each other relative to the nominal tile position;

FIG. 11 is a fragmentary cross-sectional view, taken in a circumferential direction, of the ducted fan housing shown in FIGS. 1-5, 7, and 8, showing the drive and driven tiles in the nominal tile position;

FIG. 12 is a fragmentary cross-sectional view, taken in a circumferential direction, of the ducted fan housing shown in FIGS. 1-5 and 7, 8, and 11, showing the drive and driven tiles in the dilated tile position;

FIG. 13 is a fragmentary cross-sectional view of a ducted fan housing constructed in accordance with a second embodiment of the present invention, showing a drive tile of the ducted fan housing in a nominal tile position, with the drive tile including a shape memory alloy layer;

FIG. 14 is a fragmentary cross-sectional view of the ducted fan housing shown in FIG. 13, showing the drive tile in a dilated tile position;

FIG. 15 is a fragmentary cross-sectional view of a ducted fan housing constructed in accordance with a third embodiment of the present invention, showing a drive tile of the ducted fan housing in a nominal tile position, with the drive tile including a shape memory alloy layer;

FIG. 16 is a fragmentary cross-sectional view of the ducted fan housing shown in FIG. 15, showing the drive tile in a dilated tile position;

FIG. 19 is a fragmentary plan view of a ducted fan housing constructed in accordance with a fifth embodiment of the present invention and having a flexible sleeve;

FIG. 20 is a fragmentary cross-sectional side elevation view of a portion of the ducted fan housing taken along line A-A of FIG. 19;

FIG. 21 is a fragmentary cross-sectional side elevation view of a portion of the ducted fan housing taken along line B-B of FIG. 19;

FIG. 22 is a fragmentary cross-sectional rear elevation view of a portion of the ducted fan housing taken along line C-C of FIG. 19;

FIG. 23 is a fragmentary cross-sectional side elevation view of lamination layers within rigid and flexible areas of the flexible sleeve;

FIG. 24 is a fragmentary plan view of the ducted fan housing constructed in accordance with a fifth embodiment, wherein the ducted fan housing includes a thrust reverser;

FIG. 25 is a fragmentary cross-sectional side elevation view of a portion of the ducted fan housing taken along line D-D of FIG. 24; and FIG. 26 is a fragmentary cross-sectional side elevation view of a portion of the ducted fan housing taken along line E-E of FIG. 24.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. It is contemplated that the invention has general application to processing financial transaction data by a third party in industrial, commercial, and residential applications. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Figure 1:
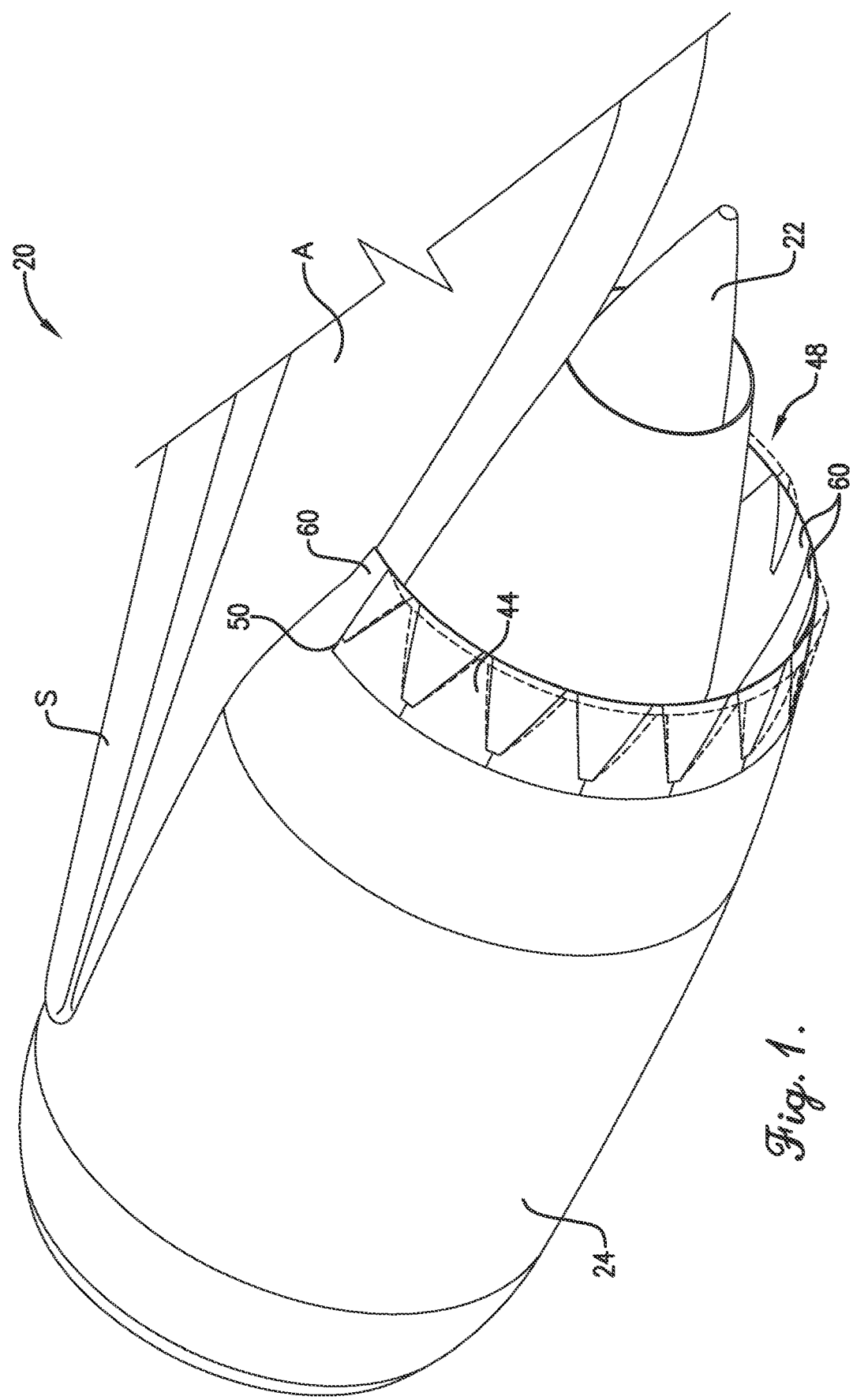
FIG. 1 is a fragmentary perspective view of a jet aircraft with a turbofan jet engine constructed in accordance with a first embodiment of the present invention and showing nozzle sections of the engine in nominal and dilated configurations.

Referring to FIG. 1, an exemplary turbofan engine 20 is shown. A turbofan engine is a gas turbine engine operable to provide thrust for a jet aircraft A. It will be understood that the principles of the present invention are applicable to other types of gas turbine engines, such as turbojet or turboprop. The exemplary turbofan engine 20 may broadly include an engine core 22 and a ducted fan assembly 24.

Figure 2:
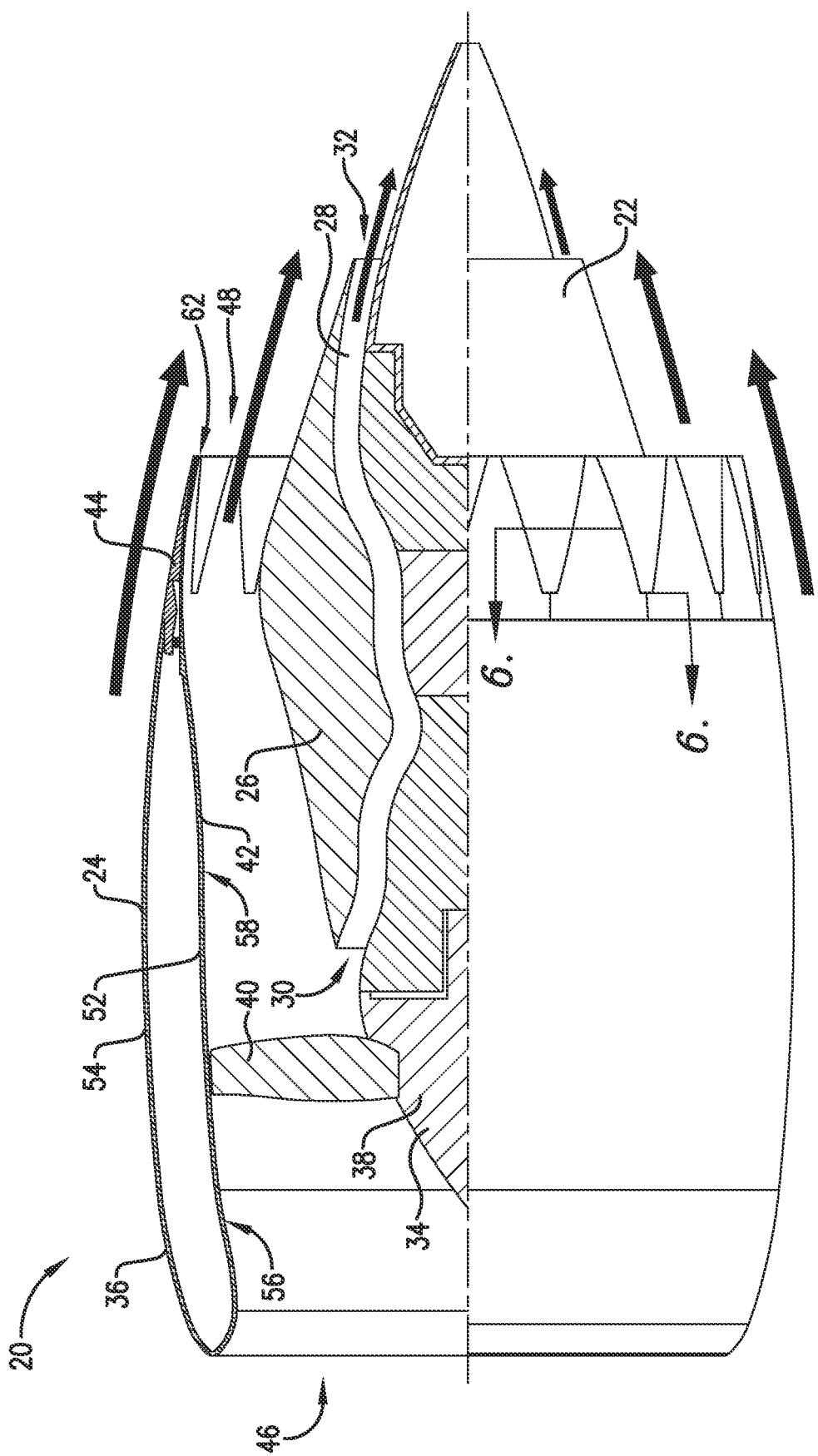
FIG. 2 is a partial cross-sectional view of the turbofan jet engine shown in FIG. 1, showing an engine core and a ducted fan assembly, with the ducted fan assembly including a ducted fan housing, and with the ducted fan housing including an annular cowling and the nozzle sections attached to an aft end of the annular cowling.
Figure 3:
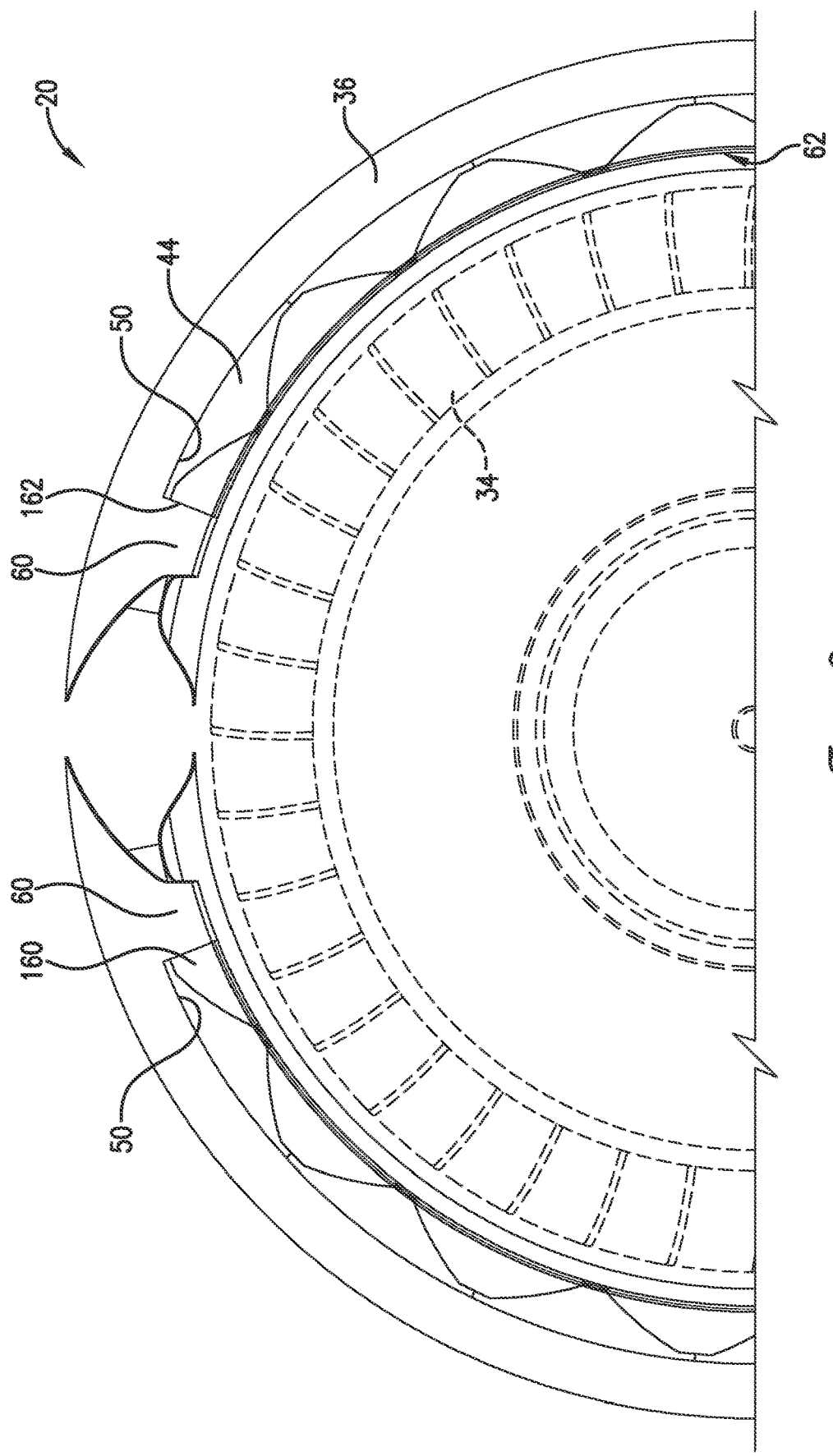
FIG. 3 is a fragmentary rear elevational view of the turbofan jet engine shown in FIGS. 1 and 2.
Figure 4:
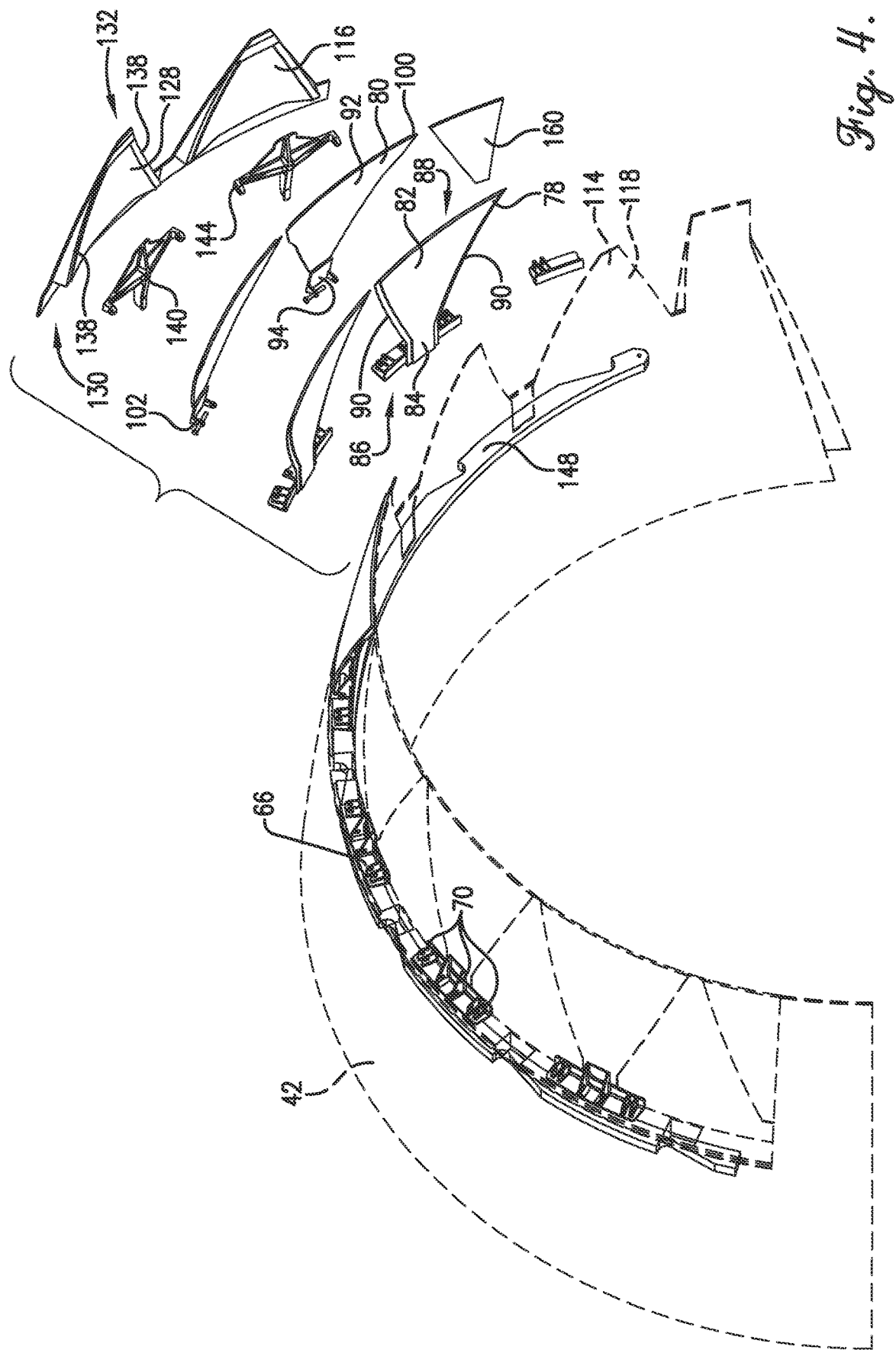
FIG. 4 is a partly exploded fragmentary view of the ducted fan housing shown in FIGS. 1-3, showing the nozzle section with some of the drive tiles, driven tiles, and tile brackets being exploded away from the nozzle section.

Referring to FIGS. 1-3, the engine core 22 may be coupled to a strut S of the jet aircraft A and operate in a manner similar to a turbojet. However, the engine core 22 may serve to power the ducted fan assembly 24, as will be discussed in greater detail. The engine core 22 may include a housing 26 that partly defines a flow path 28. The engine core 22 may also include a compressor (not shown), a combustion assembly (not shown), and a turbine (not shown) that are spaced along the flow path 28. In operation, ambient air is drawn into an inlet 30 of the flow path 28 by the compressor. The compressed air is introduced into the combustion assembly and provides oxygen for combustion of fuel that is also introduced into the combustion assembly. Exhaust flow from the combustion assembly drives the turbine and exits the flow path 28 through outlet 32. The engine core 22 also includes a drive shaft (not shown) that is drivingly coupled with the turbine of the engine core 22 and is drivingly attached to the ducted fan assembly 24, as will be discussed, to transmit power from the engine core 22 to the ducted fan assembly 24.

The ducted fan assembly 24 may broadly include a fan 34 and a ducted fan housing 36. The fan 34 may include a hub 38 and a plurality of fan blades 40 spaced about and attached to the hub 38. The fan 34 may be drivingly attached to the engine core 22 by attaching the drive shaft of the engine core 22 to the hub 38. Thus, the turbine of the engine core 22 rotates and thereby causes the fan 34 to rotate and create thrust.

The ducted fan housing 36 may surround the fan 34 and further enable the fan 34 to provide thrust. In particular, the ducted fan housing 36 may include an annular cowling 42 and dilating fan duct nozzle sections 44. The annular cowling 42 may present an inlet end 46 and a nozzle end 48. Along the nozzle end 48, the annular cowling 42 may present a pair of recesses 50 that receive the nozzle sections 44. However, the annular cowling 42 could be alternatively configured to present an alternative number of recesses 50 for receiving nozzle sections 44. The annular cowling 42 may include inner and outer arcuate panels 52,54 that extend between the inlet end 46 and the nozzle end 48. The annular cowling 42 may be attached to the strut S that is coupled to the engine core 22 and restricts relative movement between the annular cowling 42 and the engine core 22. The ducted fan housing 36 may form an inlet duct 56 that extends from the inlet end 46 and rotatably receives the fan 34. Also, the inner panel 52 and the housing 26 may cooperatively form a bypass duct 58 that extends in an aft direction from and fluidly communicates with the inlet duct 56. The bypass duct 58 may be operable to discharge some of the air from the inlet duct 56. Thus, ambient air is drawn into the inlet duct 56 by the fan 34, with some of the air being received by the engine core 22 and a remainder of the air being discharged into the bypass duct 58 and through the nozzle end 48.

The nozzle sections 44 may function to control the flow of fan exhaust into the external flow of air and thereby affect thrust and noise produced by the turbofan 20. Each nozzle section 44 may be received by a corresponding one of the recesses 50. The nozzle sections 44 and adjacent portions 60 of the annular cowling 42 may cooperatively form a nozzle with a nozzle orifice 62. However, the principles of the present invention are also applicable to designs in which the annular cowling 42 does not form part of the nozzle. As will be discussed in greater detail, each nozzle section 44 may have a combination of intermeshing tiles that extend continuously and cooperatively form a geodesic division of the nozzle surface. The intermeshing tiles may also cooperatively permit the nozzle to shift between nominal and dilated configurations and thereby control the fan exhaust flow (see FIG. 1). In alternative implementations, the nozzle may include a different number of dilating fan duct nozzle sections, such as a single dilating fan duct nozzle section. Furthermore, for some aspects of the present invention, the nozzle could include an endless dilating fan duct nozzle section.

Referring to FIGS. 4-12, the nozzle sections 44 may be attached to an annular bulkhead 64 of the annular cowling 42 (see FIGS. 7 and 8). The nozzle sections 44 may include a plurality of brackets 66 that are spaced circumferentially along and fixed to the annular bulkhead 64. Each bracket 66 may be unitary and include an L-shaped body 68 and gussets 70. Pairs of gussets 70 may be positioned adjacent opposite ends of the body 68, with a third pair of gussets 70 spaced centrally along the length of the body 68. The gussets 70 may present holes 72 for pivotally receiving tiles, as will be discussed further. In alternative implementations, the nozzle sections 44 may be supported for shiftable movement relative to the annular cowling 42.

The nozzle sections 44 may each include a plurality of drive tiles 74 and a plurality of driven tiles 76 which intermesh with one another, as will be discussed in greater detail. The driven tiles 76 may each include inner and outer driven tile sections 78,80. The inner driven tile sections 78 may each include a generally trapezoidal-shaped body 82 and a tab 84, with each section 78 including fore and aft ends 86,88, and with a width of the body 82 tapering toward the tab 84 to form the trapezoidal shape. The body 82 and tab 84 may cooperatively present stepped side ledges 90 that extend between the ends 86,88. The outer driven tile sections 80 may also include a generally trapezoidal shaped body 92 and a tab 94, with each section 80 including fore and aft ends 96,98, and with a width of the body 92 tapering toward the tab 94 to form the trapezoidal shape. The body 92 may present stepped side ledges 100 that extend between the ends 96,98. The outer driven tile section 80 may also include hinge arms 102 attached to the tab 94. In alternative implementations, the body 82 or the body 92 may present a different shape, such as a trapezoid that tapers away from the tab 84, or a substantially triangular shape. The inner driven tile section 78 is normally arcuately shaped to present radially inner and outer surfaces 104,106 (see FIG. 7) that are concave and convex, respectively. The outer driven tile section 80 is also normally arcuately shaped to present radially inner and outer surfaces 108,110 (see FIG. 7) that are concave and convex, respectively. In alternative implementations, the sections 78,80 may present surfaces that are flat or have a different shape. Further, the driven tiles 76 may be unitary or otherwise differently configured so as to intermesh with adjacent drive tiles 74, as will be discussed.

Each of the sections 78,80 may be attached to a respective one of the brackets 66. More specifically, the tab 84 of the inner driven tile section 78 may be attached to a lower side 112 of the bracket 66, with the body 82 being cantilevered in the aft direction away from the bracket 66. The hinge arms 102 of the outer driven tile section 80 may be pivotally attached to centrally positioned gussets 70 with pins so that the outer driven tile section 80 is operable to pivot relative to the respective bracket 66. In alternative implementations, the section 80 may be differently attached relative to the bracket 66 and the section 78. For example, the section 80 may be directly attached to the section 78. Furthermore, the section 78 may be differently attached relative to the bracket 66.

The sections 78,80 may be shiftable so that the driven tiles 76 can shift between a radially innermost nominal position and a radially outermost dilated position. The sections 78,80 may slidably engage one another adjacent the aft ends 88,98 as the driven tiles 76 shift between the positions.

Each of the drive tiles 74 may include inner and outer drive tile sections 114,116 (see FIG. 11). The inner drive tile sections 114 may each include a generally trapezoidal shaped body 118, with each section 114 including fore and aft ends 120,122, and with a width of the body 118 tapering in the aft direction to form the trapezoidal shape. In alternative implementations, the sections 114 may have a different shape. The inner drive tile sections 114 may be arcuately shaped to present radially inner and outer surfaces 124,126 that are concave and convex, respectively. In alternative implementations, the sections 114 may present surfaces that are flat or have a different shape. The inner drive tile sections 114 may be integrally formed with the inner panel 52. In alternative implementations, the inner drive tile sections 114 may be separate from the inner panel 52.

The outer drive tile sections 116 may each include a generally trapezoidal shaped body 128, with each section 116 including fore and aft ends 130,132, and with a width of the body 128 tapering in the aft direction to form the trapezoidal shape. In alternative implementations, the sections 114 may have a different shape. The body 128 may include a flat portion 134 and a wedge portion 136 which are fixed to one another. Thus, the portions 134,136 may cooperate so that the body 128 has a thickness that tapers from the fore end 130 toward the aft end 132. The body 128 may present an outer surface 139 that is convex, and may present stepped side ledges 138 that extend between the ends 130,132.

Yet further, the outer drive tile sections 116 may each include a tile lever 140 with an elongated lever arm 142 and opposite hinge elements 144 that extend transversely to the lever arm 142. The tile lever 140 may be attached to the flat portion 134 of the body 128 adjacent the fore end 130, with the lever arm 142 projecting away from the body 128.

The outer drive tile sections 116 may be pivotally attached to respective brackets 66 by attaching the hinge elements 144 to corresponding pairs of gussets 70 with pins. The tile lever 140 may extend through an opening 146 in the annular bulkhead 64 and into the annular cowling 42. The drive tile sections 114,116 may be shiftable so that the drive tiles 74 can shift between a radially innermost nominal position and a radially outermost dilated position. The sections 114,116 may slide relative to one another adjacent the aft ends 122,132 as the drive tiles 74 shift between the positions. The inner drive tile sections 114 may be integrally formed with the inner panel 52 so as to be biased into the dilated position. In other words, the inner drive tile sections 114 may be spring-loaded in the nominal position to urge the drive tiles 74 from the nominal position to the dilated position. In alternative implementations, the sections 114 may not be spring-loaded in the nominal position. Further, the nominal position of the drive tile sections 114,116 may be a radially outermost position, with the drive tile sections 114,116 being biased to shift radially inwardly from the radially outermost position.

Figure 5:
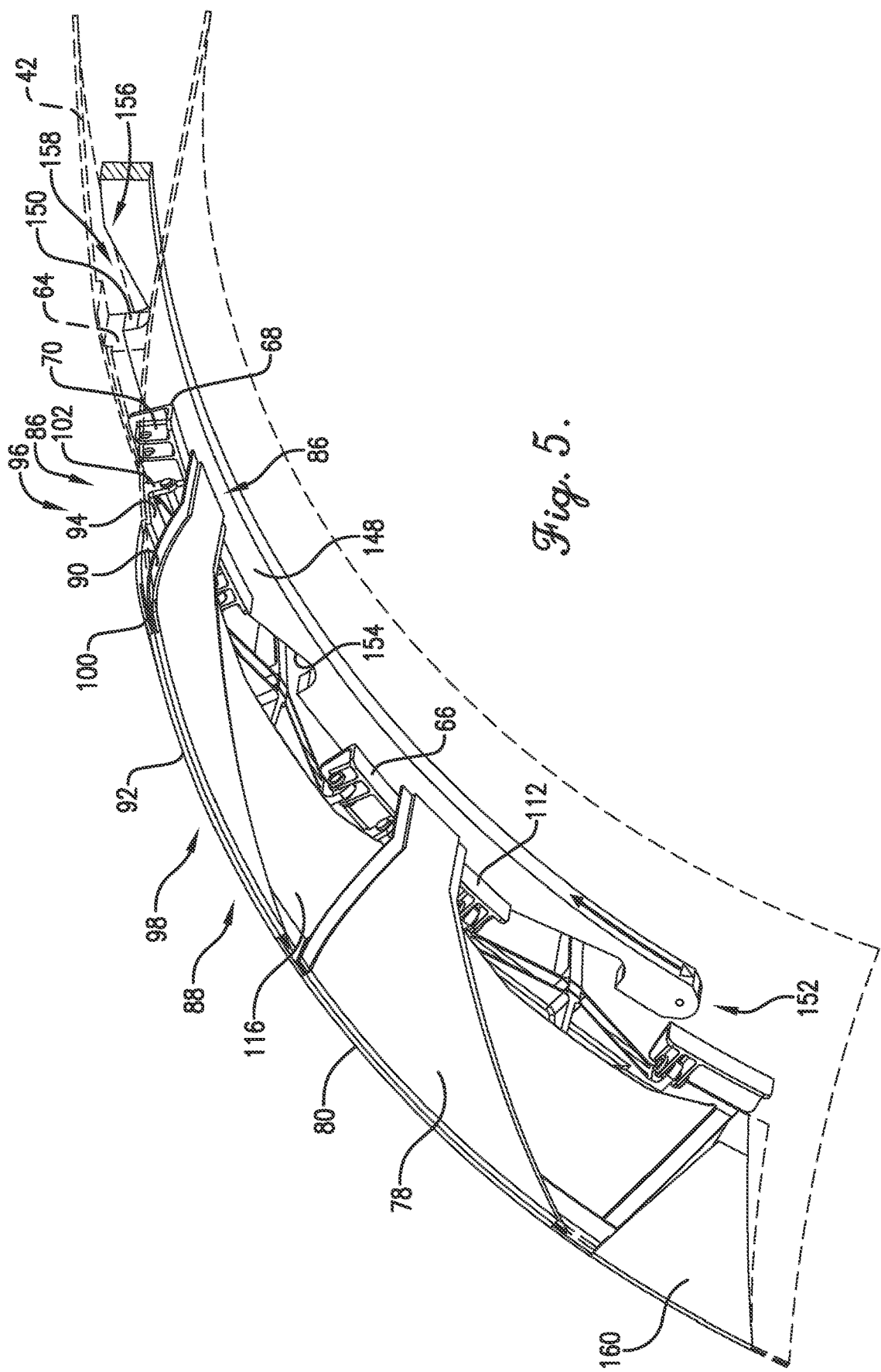
FIG. 5 is an enlarged fragmentary view of the ducted fan housing shown in FIGS. 1-4, with portions of the drive tiles removed.
Figure 6:
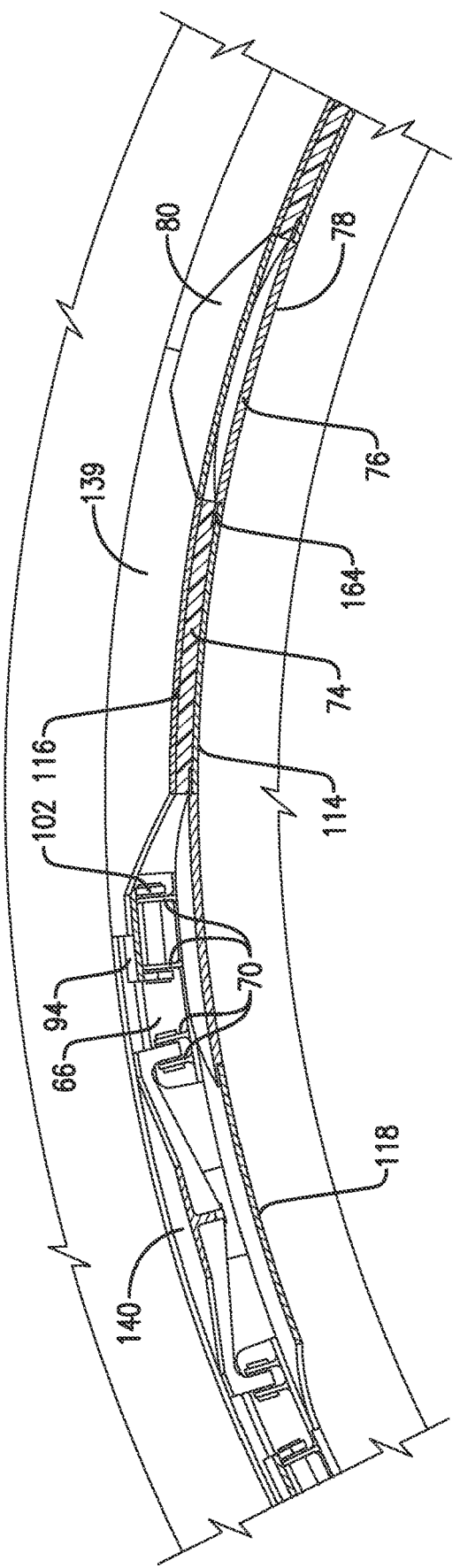
FIG. 6 is a cross-sectional view of the dilating fan duct nozzle taken along line 6-6 in FIG. 2.

Each nozzle section 44 may also include, as best seen in FIG. 5, an annular cam 148 which is rotatably received adjacent the annular bulkhead 64 for shifting the drive tiles 74 between the positions. The annular cam 148 may present a cam surface 150 and an actuation end 152 which is operable to be driven by a power source (not shown), such as a hydraulic cylinder or electric motor. The cam surface 150 may include ramp segments 154 that engage respective tile levers 140. The annular cam 148 may be received within the annular cowling 42 and shiftable in a circumferential direction relative to the annular cowling 42.

In a first circumferential position, the tile levers 140 may each be positioned between a raised end 156 and a recessed end 158 of the ramp segments 154, with the drive tiles 74 being in the nominal position. In a second circumferential position spaced from the first circumferential position, the annular cam 148 may be positioned so that the tile levers 140 are each received adjacent the recessed end 158 of the ramp segments 154. Again, the drive tiles 74 may be biased from the nominal position to the dilated position because the inner drive tile section 114 urges the drive tile 74 in a radially outward direction from the nominal position to the dilated position. Therefore, with the annular cam 148 in the second circumferential position, the drive tiles 74 may be permitted to shift into the dilated position. Similarly, the annular cam 148 may be operable to return the drive tiles 74 from the dilated position to the nominal position by shifting the annular cam 148 from the second circumferential position to the first circumferential position.

As mentioned, the drive and driven tiles 74,76 may be positioned in alternating fashion in a circumferential direction and intermesh with one another to form nozzle sections 40. Each nozzle section 44 may further includes end tiles 160 that are similar to the driven tiles 76 in that each end tile 160 intermeshes with an adjacent drive tile 74 and is driven by the adjacent drive tile 74. However, the end tiles 160 may each present a side edge 162 operable to remain next to an adjacent edge of the annular cowling 42 while an opposite side edge moves with the drive tile 74. In alternative implementations, the end tiles 160 may be differently configured to provide a different transition between the adjacent drive tile 74 and the adjacent edge of the annular cowling 42.

Each drive tile 74 may presents grooves 164 that are cooperatively formed by the inner and outer drive tile sections 114,116. Each driven tile 76 may be received by corresponding grooves 164, i.e., the stepped side ledges 90,100 are received therein, so that the drive and driven tiles 74,76 move with one another as the drive tiles 74 arc shifted between the nominal and dilated positions. In alternative implementations, the drive tiles 74 may each be received within the adjacent driven tiles 76. The illustrated drive tiles 74 may be relatively more rigid than the driven tiles 76 so that the driven tiles 76 conform to the position of the drive tiles 74. Thus, movement of the drive tiles 74 may cause the nozzle to shift between corresponding nominal and dilated configurations. In alternative implementations, the driven tiles 76 and driven tiles 74 may have the same or approximately the same rigidity.

In the nominal configuration, the drive and driven tiles 74,76 may be positioned in the radially innermost nominal positions, with the driven tiles 76 being received within respective drive tiles 74, and with substantially maximum overlap between adjacent tiles 74,76 (see FIG. 9). Thus, in the nominal configuration, the nozzle orifice 62 may be contracted to have a substantially minimum nozzle area. In the dilated configuration, the drive and driven tiles 74,76 may be positioned in the radially outermost nominal positions, with the driven tiles 76 being received within respective drive tiles 74, and with substantially minimum overlap between adjacent tiles 74,76 (see FIG. 10). Thus in the dilated configuration, the nozzle orifice 62 may be expanded to have a substantially maximum nozzle area. The maximum nozzle area may be in the range of about 10-20 percent larger than the minimum nozzle area. In alternative implementations, the maximum nozzle area may be less than 10 percent or greater than 20 percent of the minimum nozzle area.

The drive and driven tiles 74,76 may also cooperatively present substantially continuous inner and outer tiled surfaces 166,168, with the tiles 74,76 being arranged to give the surfaces 166,168 a geodesic division. In particular, the inner tiled surface 166 may be cooperatively formed by the inner surfaces 104,124, and the outer tiled surface 168 may be cooperatively formed by the outer surfaces 110,139. The tiled surfaces 166,168 may remain substantially continuous as the nozzle shifts between the configurations.

In operation, the nozzle sections 44 may be operable to control the nozzle orifice size as the aircraft A is operated in different flight regimes. The nozzle sections 44 may be normally operated in the nominal configuration with the tiles 74,76 in the radially innermost nominal positions (see FIG. 9). When it is desirable or necessary to expand the nozzle orifice 62, the annular cams 148 may be shifted by the power source in a first circumferential direction so that the tile levers 140 are permitted to slide downwardly along the respective ramp segments 154. Consequently, the tiles 74,76 may shift simultaneously into dilated positions so that the nozzle sections 44 are in the dilated configuration and the nozzle orifice 62 is expanded to present the maximum nozzle area (see FIG. 10). The annular cams 148 may be shiftable by the power source in a second circumferential direction opposite to the first circumferential direction so that the tile levers 140 are forced to slide upwardly along the respective ramp segments 154. Consequently, the tiles 74,76 may shift simultaneously back into the nominal positions so that the nozzle sections 44 are in the dilated configuration and the nozzle orifice 62 is contracted to present the minimum nozzle area. Further, the tiles 74,76 may be shifted to any position intermediate the nominal and dilated positions to provide a predetermined size of the nozzle orifice 62.

Referring to FIGS. 13-18, alternative embodiments of the present invention are depicted. For the sake of brevity, the remaining description will focus primarily on the differences of these alternative embodiments from the embodiment described above.

Referring to FIGS. 13 and 14, an alternative ducted fan housing 200 may include an annular cowling 202 and alternative dilating fan duct nozzle sections 204. The nozzle sections 204 may include, among other things, drive tiles 206 having inner and outer drive tile sections 208,210. The inner drive tile section 208 may include a body 212 that is integrally formed with the annular cowling 202. The inner drive tile section 208 may also include a shape memory alloy layer 214 attached to the body 212 with screws (not shown). The shape memory alloy layer 214 may be operable to shift between nominal and dilated shapes that correspond with nominal and dilated positions of the drive tiles 206. In particular, the shape memory alloy layer 214 may include shape memory alloy material that shifts the layer 214 between the shapes in response to changes in temperature. Thus, the layer 214 may be configured to take the nominal shape when at a relatively cool temperature, and to take the dilated shaped when at a relatively hot temperature. In this manner, the layer 214 may be configured to shift the drive tiles 206 in response to temperature. The temperature change could be provided by various types of power sources. For example, an electric heating element could be attached to the layer 214 and powered by the turbofan engine 20. In alternative implementations, a different type of power source that is powered by the turbofan engine 20 could be configured to selectively heat the layer 214.

The outer drive tile sections 210 may also include a tile lever 216 with an elongated lever arm. The nozzle sections 204 may include a helical spring 218 positioned between a lower panel of the cowling 202 and the lever arm. The illustrated spring 218 may normally urge the lever arm outwardly and thereby urge the tile sections 208,210 radially inwardly to the nominal position. As the layer 214 is heated and takes the dilated shape, the layer 214 may act to shift the tile sections 208,210 against the spring 218 and into the dilated position. As the layer 214 cools and returns to the nominal shape, the spring 218 may act against the layer 214 and return the tile sections 208,210 to the nominal position.

Referring to FIGS. 15 and 16, an alternative ducted fan housing 300 may include an annular cowling 302 and alternative dilating fan duct nozzle sections 304. The nozzle sections 304 may include, among other things, drive tiles 306 having inner and outer drive tile sections 308,310. The outer drive tile section 310 may be substantially unitary and present an end 312 fixed to the cowling 302, with the outer drive tile section 310 and cowling 302 forming a lap joint. The inner drive tile section 308 may include a body 314 that is integrally formed with the annular cowling 302. The inner drive tile section 308 may also include a shape memory alloy layer 316 attached to the body 314 with screws (not shown). The shape memory alloy layer 316 may be operable to shift between nominal and dilated shapes that correspond with nominal and dilated positions of the drive tiles 306. In particular, the shape memory alloy layer 316 may include shape memory alloy material that shifts the layer 316 between the shapes in response to changes in temperature. As the layer 316 is heated, the layer 316 may flex the body 314 radially outwardly into the dilated position. The tile sections 308,310 may both be flexible so that the outer drive tile section 310 is flexed by the body 314 and shifts with the body 314 into the dilated position. As the layer 316 is cooled, the layer 316 may return the body 314 to the nominal position, with the outer drive tile section 310 also flexing back into the nominal position.

Figure 17:
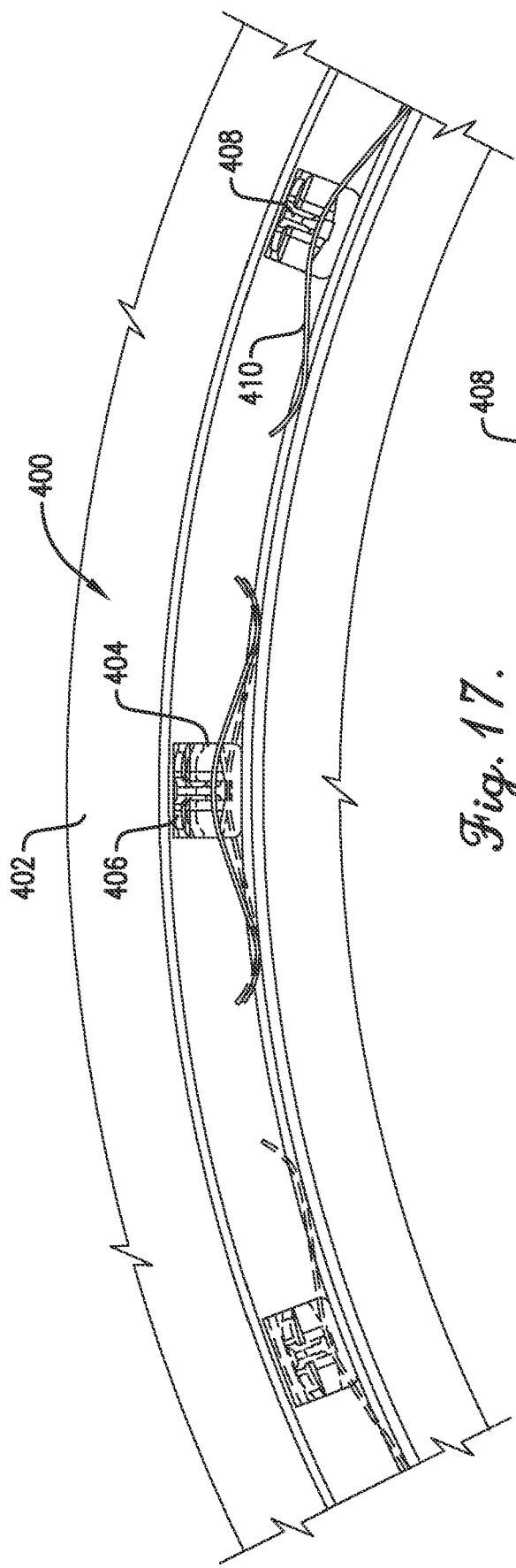
FIG. 17 is a fragmentary cross-sectional view of a ducted fan housing constructed in accordance with a fourth embodiment of the present invention, showing drive tiles of the ducted fan housing in both a nominal tile position and a dilated tile position, with each drive tile being positioned by a respective shape memory alloy drive element.
Figure 18:
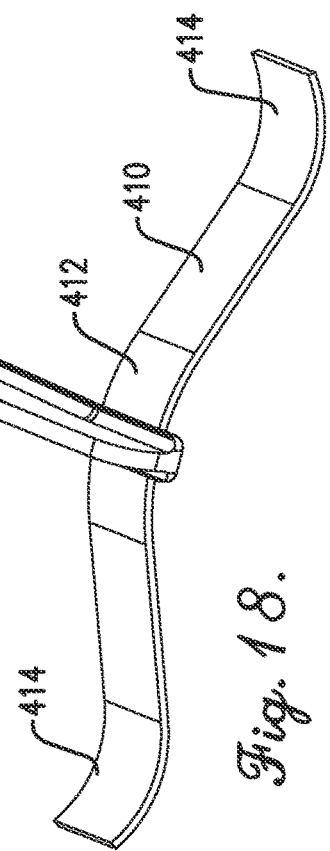
FIG. 18 is an enlarged fragmentary perspective view of the ducted fan housing shown in FIG. 17, showing a tile lever of the drive tile and the drive element.

Referring to FIGS. 17 and 18, an alternative ducted fan housing 400 may include an annular cowling 402 and alternative dilating fan duct nozzle sections 404. The nozzle sections 404 may include, among other things, drive tiles 406 that include a tile lever 408. The nozzle sections 404 may also include shape memory alloy springs 410. The springs 410 may have an arcuate center portion 412 and arcuate ends 414. The springs 410 may be shiftable between nominal and dilated shapes that correspond with nominal and dilated positions of the drive tiles 406. The springs 410 may be positioned between a lower panel of the annular cowling 402 and the tile lever 408. With the spring 410 in the nominal shape, the center portion 412 may be in a radially outermost position that shifts the tile lever 408 radially outwardly and correspondingly shifts the drive tile 406 in the nominal position. With the spring 410 in the dilated shape, the center portion 412 may be in a radially innermost position that permits the tile lever 408 to shift radially inwardly, with the drive tile 406 being permitted to shift into the dilated position.

Referring to FIGS. 19-26, an alternative ducted fan housing 500 includes an annular cowling 502 and an adjustable fan duct nozzle 504. In general, the annular cowling 502 may be substantially as described for other embodiments. In particular, the annular cowling 502 may be constructed of a laminate of graphite and epoxy, or other similar material or materials, and may substantially surround the fan and extend rearwardly thereof, between fore and aft ends, so as to fluidly engage the duct flow generated by the fan. The adjustable fan duct nozzle 504 may be located at the aft end of the annular cowling 502 so as to fluidly engage the duct flow as it exits the nozzle end of the engine. The adjustable fan duct nozzle 504 may include a flexible sleeve 506 and a drive mechanism (not shown here, but shown in various other figures).

The flexible sleeve 506 may include a plurality of rigid areas 510 arranged circumferentially around the fan duct nozzle 504 and connected by flexible areas 512 so as to form a substantially unitary sleeve structure, with the rigid areas 510 being radially moveable between a normal configuration resulting in a smaller nozzle orifice and a dilated configuration resulting in a larger nozzle orifice. In and between both configurations, the flexible sleeve 506 may remain a substantially unitary structure without any interface gaps or seal breaks. In various implementations, the flexible sleeve 506 may be constructed of hybrid composite or metal hybrid materials. Though shown adapted for use as part of a VAFN for a turbofan engine, the flexible sleeve may be alternatively adapted for use as part of a primary nozzle of the turbofan engine, or as part of a variable geometry chevron for the turbofan engine.

The rigid areas 510 may correspond functionally to the tiles of other embodiments, in that movement of the rigid areas 510, like movement of the tiles, adjusts the size of the nozzle orifice. In one implementation, the rigid areas 510 may be generally triangular in shape. In one implementation, the rigid areas 510 may be constructed at least in part from laminated graphite and epoxy. In one implementation, the plurality of rigid areas 510 may include drive areas 514 (which may corresponding functionally to the drive tiles of earlier embodiments) arranged alternatingly with driven areas 516 (which may correspond functionally to the driven tiles of earlier embodiments), and the drive mechanism may be configured to move the drive areas 514, and the drive areas 514 may be configured to, in turn, move the driven areas 516, between the normal configuration and the dilated configuration. Further, in various implementations, as in other embodiments, at least some of the plurality of rigid areas may be naturally biased toward the normal configuration or toward the dilated configuration, such that these rigid areas are naturally urged toward one of the configurations when placed in the other configuration.

The flexible areas 512 may flex so as to remain continuously connected to the rigid areas 510 in both the normal configuration and the dilated configuration. The flexible areas 512 may be integrated into the structure of the flexible sleeve 506 between the rigid areas 510, so that the flexible sleeve 506 remains substantially or completely sealed and does not rely on hinges, overlaps, or similar mechanical solutions, which thereby improves aerodynamic cleanliness and sealing qualities while also reducing complexity and weight. In one implementation, the flexible areas 512 may be constructed at least in part from laminated graphite and soft resin. The soft resin may be a polymeric material having a lower modulus than the resin in the rigid areas 510. The soft resin may be an elastomeric material. The soft resin may have a high elongation. In one implementation, at least some of the flexible areas 512 may be reinforced with fibers. Flexible areas 512 that are fiber-reinforced may have a different amount of fiber, a different weave, or a different orientation than is used in the rigid areas 510, and may have a different type of fiber or material with a lower modulus than the type of fiber used in the rigid areas 510.

FIG. 23 shows an exemplary construction of the rigid and flexible areas 510,512 including a plurality of plies or lamination layers 518. In one implementation, the lamination layers of the flexible areas 512 tie the drive areas 514 to the driven areas 516 so that when the drive mechanism moves the drive areas 514, the drive areas 514, in turn, move the driven areas 516.

In general, the drive mechanism may be substantially as described for other embodiments, and configured to move at least some (e.g., the drive areas 514) of the plurality of rigid areas 510 between the normal configuration and the dilated configuration so as to adjust the size of nozzle orifice and thereby control the duct flow exiting the nozzle end of the engine. The drive mechanism may include one or more drive elements attached to or embedded in the at least some of the plurality of rigid areas and configured to transfer a drive force to move the at least some of the plurality of rigid areas between the normal configuration and the dilated configuration. In various implementations, the drive elements may be substantially or identical in form and/or function to those described and shown for earlier embodiments, such as the axially extending lever that is pivotally attached to a bracket and/or the cam configured to transfer the drive force to the lever, or the shape memory alloy material.

Referring to FIGS. 24-26, the ducted fan housing 600 may include a thrust reverser 602, and the flexible sleeve 604 is shown adapted for use with the thrust reverser 602. The annular cowling 606 may present a rigid inner acoustic panel 606 and a rigid outer thrust reverser cowl 608. A fastening mechanism 610 may fasten or otherwise connect the panel 606 and the cowl 608. The flexible sleeve 604 may include an additional flexible joint area 612 extending partly or entirely circumferentially around the housing 600 so as to connect the thrust reverser cowl 608 and the flexible sleeve 604 in such a manner as to facilitate independent deployment of the thrust reverser 602 and adjustment of the nozzle orifice. Each of the panel 606 and the cowl 608 may include a plurality of the rigid areas 614 and the associated flexible areas 616 which allow for adjusting the size of the nozzle orifice. Except for the adaptations noted, the flexible sleeve 604 and associated drive mechanism may function substantially or identically as described above.

Thus, the flexible sleeve 506,604 advantageously retains the ability of earlier embodiments to adjust the size of the nozzle orifice but reduces or eliminates the pivoting or sliding interfaces, and thereby improves aerodynamic cleanliness and sealing qualities while also reducing complexity and weight.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A ducted fan housing for directing a duct flow generated by a fan in a rearward direction, the ducted fan housing comprising:
   an annular cowling having an aft end and surrounding the fan and extending rearwardly of the fan to the aft end, and fluidly engaging the duct flow; and
   an adjustable fan duct nozzle located at the aft end of the annular cowling and comprising a nozzle orifice and fluidly engaging the duct flow from the annular cowling, the adjustable fan duct nozzle comprising—
      a flexible sleeve extending continuously around the nozzle orifice as a single seamless structure and comprising a plurality of rigid areas spaced circumferentially and non-overlappingly apart and radially moveable to change the flexible sleeve between a normal configuration in which the nozzle orifice is smaller and a dilated configuration in which the nozzle orifice is larger, wherein the flexible sleeve further comprises flexible areas that separate the rigid areas and remains the single seamless structure without gaps in and between the normal configuration and the dilated configuration, and
      a drive mechanism moving at least some rigid areas of the plurality of rigid areas between the normal configuration and the dilated configuration so as to adjust the nozzle orifice and thereby control the duct flow passing through the adjustable fan duct nozzle.

2. The ducted fan housing of claim 1, the rigid areas comprising a plurality of drive areas and a plurality of driven areas alternatingly arranged with and separating the drive areas and seamlessly and flexibly connected to the drive areas so that movement of the drive areas is transmitted by the flexible areas to the driven areas, wherein the flexible sleeve remains the single seamless structure without gaps between the drive areas and the driven areas in and between the normal configuration and the dilated configuration.

3. The ducted fan housing of claim 2, wherein the plurality of drive areas are constructed at least in part from laminated graphite and epoxy.

4. The ducted fan housing of claim 2, wherein the plurality of driven areas are constructed at least in part from laminated graphite and soft resin.

5. The ducted fan housing of claim 1, wherein the drive mechanism comprises one or more drive elements attached to the at least some rigid areas of the plurality of rigid areas and transferring a drive force to move the at least some rigid areas between the normal configuration and the dilated configuration.

6. The ducted fan housing of claim 5, wherein each of the one or more drive elements comprises an axially extending lever pivotally attached to a bracket.

7. The ducted fan housing of claim 6, wherein each of the one or more drive elements comprises a cam transferring the drive force to the axially extending lever.

8. The ducted fan housing of claim 5, wherein each of the one or more drive elements is constructed at least in part from a shape memory alloy material.

9. The ducted fan housing of claim 1, wherein the plurality of rigid areas are naturally biased toward the dilated configuration so as to be naturally urged toward the dilated configuration when placed in the normal configuration.

10. The ducted fan housing of claim 1, wherein the plurality of rigid areas are naturally biased toward the normal configuration so as to be naturally urged toward the normal configuration when placed in the dilated configuration.

11. The ducted fan housing of claim 1, wherein—
   the ducted fan housing further comprises a thrust reverser;
   the annular cowling further comprises a rigid inner acoustic panel and a rigid outer thrust reverser cowl; and
   the flexible sleeve further comprises a flexible joint area extending circumferentially around the ducted fan housing and connecting the flexible sleeve to the thrust reverser cowl so as to allow independent deployment of the thrust reverser and adjustment of the nozzle orifice, wherein each of the inner acoustic panel and the thrust reverser cowl comprises the plurality of rigid areas which allow for adjusting the nozzle orifice.

12. A ducted fan housing for directing a duct flow generated by a fan of an aircraft engine in a rearward direction, the ducted fan housing comprising:
   an annular cowling having an aft end and surrounding the fan and extending rearwardly of the fan to the aft end, and fluidly engaging the duct flow; and
   an adjustable fan duct nozzle located at the aft end of the annular cowling and comprising a nozzle orifice and fluidly engaging the duct flow from the annular cowling, the adjustable fan duct nozzle comprising—
      a flexible sleeve extending continuously around the nozzle orifice as a single seamless structure and comprising—
         a plurality of flexible areas,
         a plurality of drive areas spaced circumferentially apart and radially moveable to change the flexible sleeve between a normal configuration in which the nozzle orifice is smaller and a dilated configuration in which the nozzle orifice is larger,
         a plurality of driven areas alternatingly arranged with and separating the drive areas and seamlessly, flexibly, and non-overlappingly connected by the flexible areas to the drive areas so that movement of the drive areas is transmitted by the flexible areas to the driven areas,
         wherein the flexible areas separate the plurality of drive areas from the plurality of driven areas and the flexible sleeve remains the single seamless structure without gaps between the plurality of drive areas and the plurality of driven areas in and between the normal configuration and the dilated configuration, and a drive mechanism moving at least some of the plurality of drive areas between the normal configuration and the dilated configuration so as to adjust the nozzle orifice and thereby control the duct flow passing through the adjustable fan duct nozzle.

13. The ducted fan housing of claim 12, wherein the plurality of drive areas are constructed at least in part from laminated graphite and epoxy, and the plurality of driven areas are constructed at least in part from laminated graphite and soft resin.

14. The ducted fan housing of claim 12, wherein the drive mechanism comprises one or more drive elements attached to the drive areas and transferring a drive force to move the drive areas between the normal configuration and the dilated configuration, wherein each of the one or more drive elements comprises an axially extending lever pivotally attached to a bracket and a cam transferring the drive force to the axially extending lever.

15. The ducted fan housing of claim 12, wherein the drive mechanism comprises one or more drive elements attached to the drive areas and transferring a drive force to move the drive areas between the normal configuration and the dilated configuration, wherein each of the one or more drive elements is constructed at least in part from a shape memory alloy material.

16. A ducted fan housing for directing a duct flow generated by a fan of an aircraft engine in a rearward direction, the ducted fan housing comprising:

a thrust reverser;

an annular cowling having an aft end and surrounding the fan and extending rearwardly of the fan to the aft end, and fluidly engaging the duct flow, the annular cowling comprising a rigid inner acoustic panel and a rigid outer thrust reverser cowl; and an adjustable fan duct nozzle located at the aft end of the annular cowling and comprising a nozzle orifice and fluidly engaging the duct flow from the annular cowling, the adjustable fan duct nozzle comprising— a flexible sleeve extending continuously around the nozzle orifice as a single seamless structure and comprising— a plurality of flexible areas, a plurality of drive areas spaced circumferentially apart and radially moveable to change the flexible sleeve between a normal configuration in which the nozzle orifice is smaller and a dilated configuration in which the nozzle orifice is larger, and a plurality of driven areas alternatingly arranged with and separating the drive areas and flexibly and non-overlappingly connected by the flexible areas to the drive areas so that movement of the drive areas is transmitted by the flexible areas to the driven areas, wherein the flexible areas separate the plurality of drive areas from the plurality of driven areas and the flexible sleeve remains the single seamless structure without gaps in and between the normal configuration and the dilated configuration, a drive mechanism moving at least some of the plurality of drive areas between the normal configuration and the dilated configuration so as to adjust the nozzle orifice and thereby control the duct flow passing through the adjustable fan duct nozzle, and a flexible joint area extending circumferentially around the ducted fan housing and connecting the flexible sleeve to the thrust reverser so as to allow independent deployment of the thrust reverser and adjustment of the nozzle orifice.

17. The ducted fan housing of claim 16, wherein the plurality of drive areas are constructed at least in part from laminated graphite and epoxy, and the plurality of driven areas are constructed at least in part from laminated graphite and soft resin.

18. The ducted fan housing of claim 16, wherein the flexible sleeve remains the single seamless structure without gaps between the plurality of drive areas and the plurality of driven areas in and between the normal configuration and the dilated configuration.

19. The ducted fan housing of claim 16, wherein the drive mechanism comprises one or more drive elements attached to the drive areas and transferring a drive force to move the drive areas between the normal configuration and the dilated configuration, wherein each of the one or more drive elements comprises an axially extending lever pivotally attached to a bracket and a cam transferring the drive force to the axially extending lever.

20. The ducted fan housing of claim 16, wherein the drive mechanism comprises one or more drive elements attached to the drive areas and transferring a drive force to move the drive areas between the normal configuration and the dilated configuration, wherein each of the one or more drive elements is constructed at least in part from a shape memory alloy material.

* * * * *